United States Patent
Shimomura et al.

(10) Patent No.: US 6,825,863 B2
(45) Date of Patent: Nov. 30, 2004

(54) IMAGE FORMING APPARATUS WITH END OF OPERATING LIFETIME CONTROLLER

(75) Inventors: Haruyuki Shimomura, Nagoya (JP); Hiroshi Koie, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 10/391,558

(22) Filed: Mar. 20, 2003

(65) Prior Publication Data

US 2003/0184638 A1 Oct. 2, 2003

(30) Foreign Application Priority Data

Mar. 29, 2002 (JP) ........................................ 2002-095988

(51) Int. Cl.$^7$ .................... B41J 2/385; G03G 13/04; G03G 15/04
(52) U.S. Cl. .................... 347/129; 347/133; 399/32
(58) Field of Search .................... 347/129, 131, 347/132, 133, 140, 233, 236, 237, 246, 247; 399/32

(56) References Cited

U.S. PATENT DOCUMENTS 6,476,846 B1    11/2002  Kashima et al.

FOREIGN PATENT DOCUMENTS

| JP | A-5-236213    | 9/1993  |   |
|----|---------------|---------|---|
| JP | A-7-276699    | 10/1995 |   |
| JP | B2-250226     | 4/1996  |   |
| JP | A-8-123257    | 5/1996  |   |
| JP | 08-171061 A   | 7/1996  | * |
| JP | 10-138560 A   | 5/1998  | * |
| JP | A-10-202942   | 8/1998  |   |
| JP | A-10-213771   | 8/1998  |   |
| JP | A-10-319789   | 12/1998 |   |
| JP | 2000-118040 A | 4/2000  | * |
| JP | A-2001-293903 | 10/2001 |   |
| JP | 2002-149034 A | 5/2002  | * |

* cited by examiner

*Primary Examiner*—Susan Lee
(74) *Attorney, Agent, or Firm*—Oliff & Berridge, PLC (57) ABSTRACT

An image forming apparatus having a photosensitive member, an exposure device having a plurality of laser emitting elements that each irradiate a laser beam onto the photosensitive member to form an elactrostatic latent image on the photosensitive member, a developing device that supplies a developing agent to the electrostatic latent image to form a visible image, and a controller that controls the irradiation of the plurality of laser emitting elements. The controller includes a determining device that determines which laser emitting element from the plurality of laser emitting elements is closest to reaching its end of operating life and a restricting device that restricts the irradiation of the laser emitting element determined closest to reaching its end of operating life.

18 Claims, 10 Drawing Sheets

CURRENT SUPPLIED
TO LASER DIODE

DOT SHAPE

IMAGE FORMING APPARATUS WITH END OF OPERATING LIFETIME CONTROLLER

BACKGROUND OF THE INVENTION

1. Field of Invention

The invention relates to an image forming apparatus that forms an image by exposing a photosensitive member to a plurality of laser beams.

2. Description of Related Art

A laser printer is generally known as an electrophotographic image forming apparatus. In the laser printer, a uniformly charged surface of a photosensitive member is exposed to a beam of laser light emitted based on image data, to form an electrostatic latent image on the surface of the photosensitive member. The electrostatic latent image attaches toner thereto. An image is formed onto a sheet as the tone is transferred to the sheet.

As disclosed in, for example, U.S. Pat. No. 6,476,846, a plurality of laser beam emitting devices that emit laser beams are provided for a laser printer. The resolution of an image is improved by exposing the photosensitive member to the laser beams emitted from each of the plurality of laser beam emitting devices.

More specifically, as two laser beam emitting devices are controlled in parallel, the photosensitive member is scanned with the laser beams two lines at a time. Thus, line density is increased without reducing the rotating speed of the photosensitive member.

For example, an image of 1200 dpi resolution is formed with a laser printer having two laser beam emitting devices, by driving the photosensitive member at the same rotating speed as an image of 600 dpi resolution is formed with one laser beam emitting device.

SUMMARY OF THE INVENTION

The invention is directed to an image forming apparatus having a photosensitive member, an exposure device having a plurality of laser emitting elements that each irradiate a laser beam onto the photosensitive member to form an elactrostatic latent image on the photosensitive member, a developing device that supplies a developing agent to the electrostatic latent image to form a visible image, and a controller that controls the irradiation of the plurality of laser emitting elements. The controller includes a determining device that determines which laser emitting element from the plurality of laser emitting elements is closest to reaching its end of operating life and a restricting device that restricts the irradiation of the laser emitting element determined closest to reaching its end of operating life.

BRIEF DESCRIPTION OF THE DRAWINGS

An exemplary embodiment of the invention will be described in detail with reference to the following figures wherein.

DETAILED DESCRIPTION OF PREFERRED EMBODIMENTS

An exemplary embodiment of the invention will be described in detail with reference to the figures.

Figure 1:
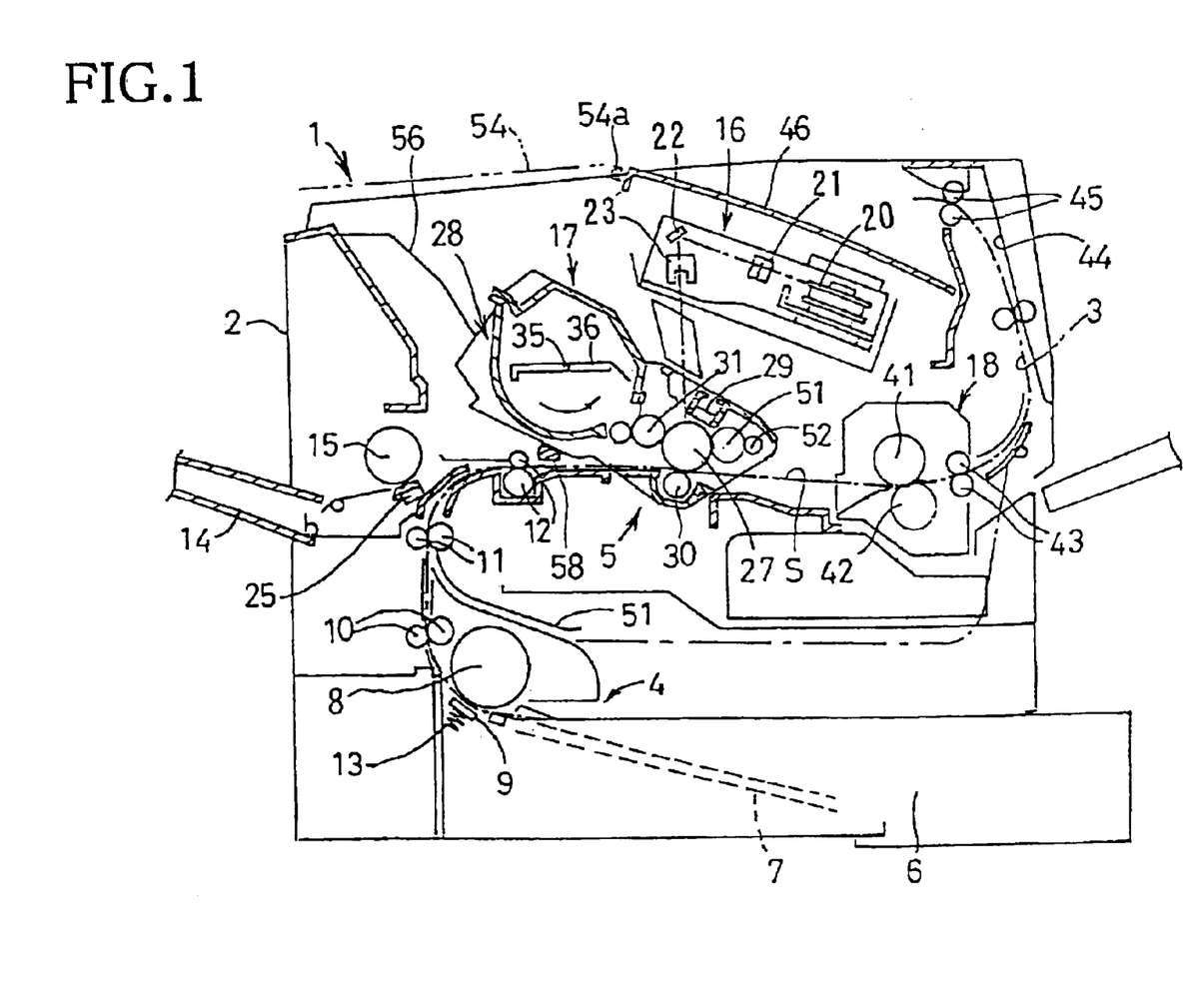
FIG. 1 is a side cross-sectional view showing a laser printer according to an embodiment of the invention.

FIG. 1 is a side cross-sectional view showing a laser printer 1 of an image forming apparatus according to an exemplary embodiment of the invention. As shown in FIG. 1, the laser printer 1 is provided in a main casing 2 with a feeder unit 4 that feeds sheets 3 of paper as a recording medium, and an image forming unit 5 that forms an image on the paper sheet 3.

The feeder unit 4 includes a paper tray 6, a paper mounting plate 7, a pick-up roller 8, a separation pad 9, paper powder removing rollers 10, conveying rollers 11 and register rollers 12. The paper tray 6 is removably set in the bottom of the main casing 2. The paper mounting plate 7 is provided in the paper tray 6. The pick-up roller 8 and the separation pad 9 are provided at an upper end of the paper tray 6. The paper powder removing rollers 10 and the conveying rollers 11 are provided downstream of the pick-up roller 8 in a sheet feeding direction. The register rollers 12 are provided downstream of the conveying rollers 11 in the sheet feeding direction.

The paper mounting plate 7 supports a stack of the paper sheets 3. The paper mounting plate 7 pivots on one end far from the pick-up roller 8, so that the other end of the paper mounting plate 7 near the pick-up roller 8 can move up and down. A spring (not shown) is disposed on the underside of the paper mounting plate 7 to urge the paper mounting plate 7 upwardly. As the amount of the paper sheets 3 stacked on the paper mounting plate 7 increases, the mounting plate 7 pivots downward about the one end far from the pick-up roller 8, against an urging force of the spring. The pick-up roller 8 and the separation pad 9 are disposed to face each other. A spring 13 disposed on the underside of the separation pad 9 presses the separation pad 9 against the pick-up roller 8.

The topmost paper sheet 3 on the paper mounting plate 7 is urged toward the pick-up roller 8 by the spring (not shown) disposed on the underside of the paper mounting plate 7. As the pick-up roller 8 rotates, a leading end portion of the topmost sheet 3 is nipped between the pick-up roller 8 and the separation pad 9. In this manner, each topmost sheet 3 is separated from the sheets 3 mounted on the paper mounting plate 7. The paper sheet 3 is fed to the paper powder removing rollers 10 where paper powders are removed. Thereafter, the paper sheet 3 is fed to a pair of register rollers 12. The register rollers 12 register the paper sheet 3, and then feed the paper sheet 3 to an image forming portion where a tone image is transferred onto the sheet 3. In this exemplary embodiment, the image forming portion is a contact portion where a photosensitive drum 27 and a transfer roller 30 contact each other.

The feeder unit 4 further includes a multi-purpose tray 14, as well as a multi-purpose pick-up roller 15 and a multi-purpose separation pad 25 that feed the sheet 3 stacked on the multi-purpose tray 14. The multi-purpose pick-up roller 15 and the multi-purpose separation pad 25 are disposed so as to face each other. The multi-purpose separation pad 25 is pressed against the multi-purpose pick-up roller 15 by a spring (not shown) provided on the underside of the multi-purpose separation pad 25. As the multi-purpose pick-up roller 15 rotates, a leading end portion of an uppermost sheet 3 on the multi-purpose tray 14 is nipped between the multi-purpose pick-up roller 15 and the multi-purpose separation pad 25. In this manner, the sheets 3 stacked on the multi-purpose tray 14 are separated one by one. The sheet 3 separated from the sheet stack on the tray 14 is then delivered to the register rollers 12.

The image forming unit 5 includes a scanner unit 16, a process unit 17, and a fixing unit 18.

Figure 3:
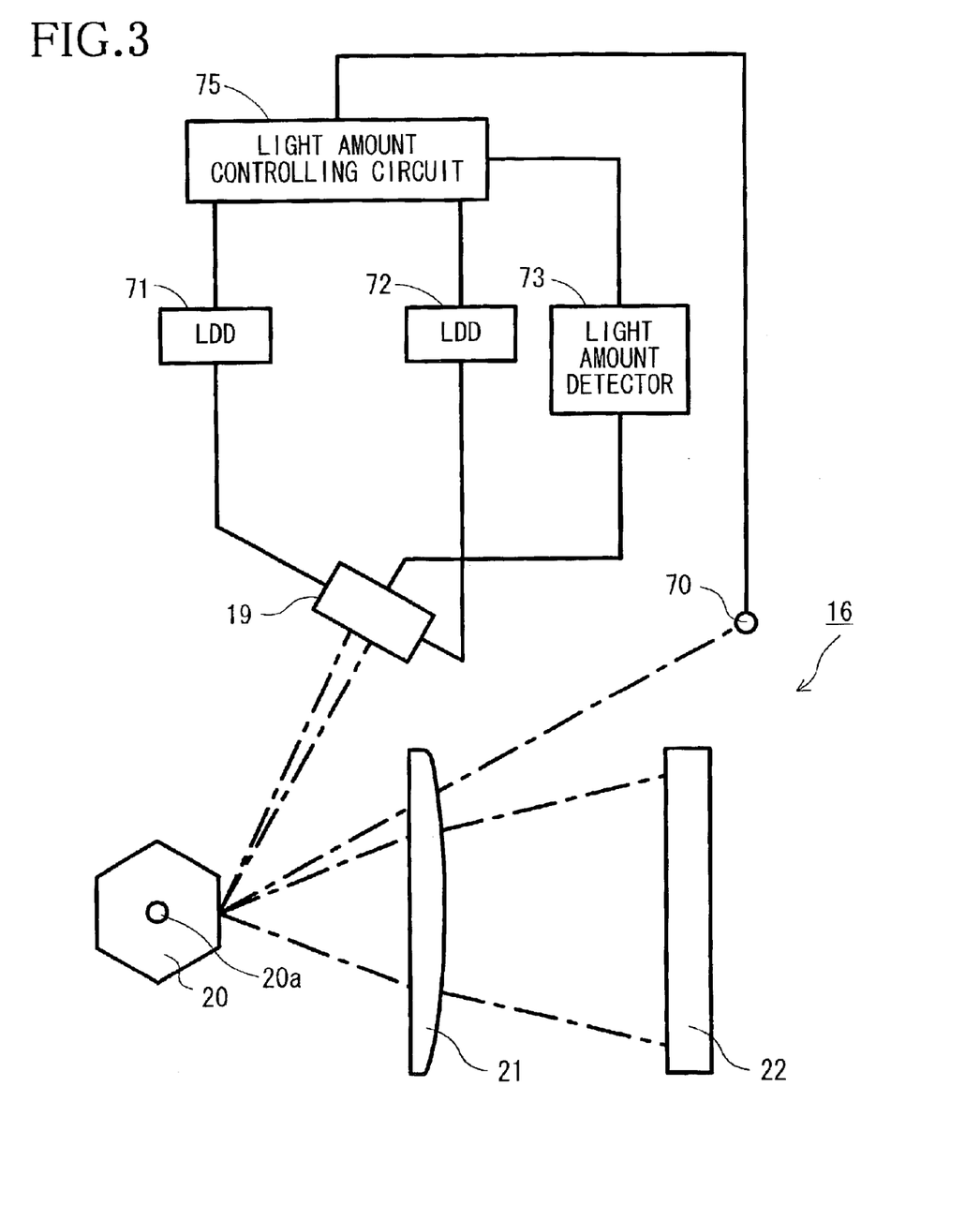
FIG. 3 is a schematic showing a scanner unit of the laser printer.
Figure 4:
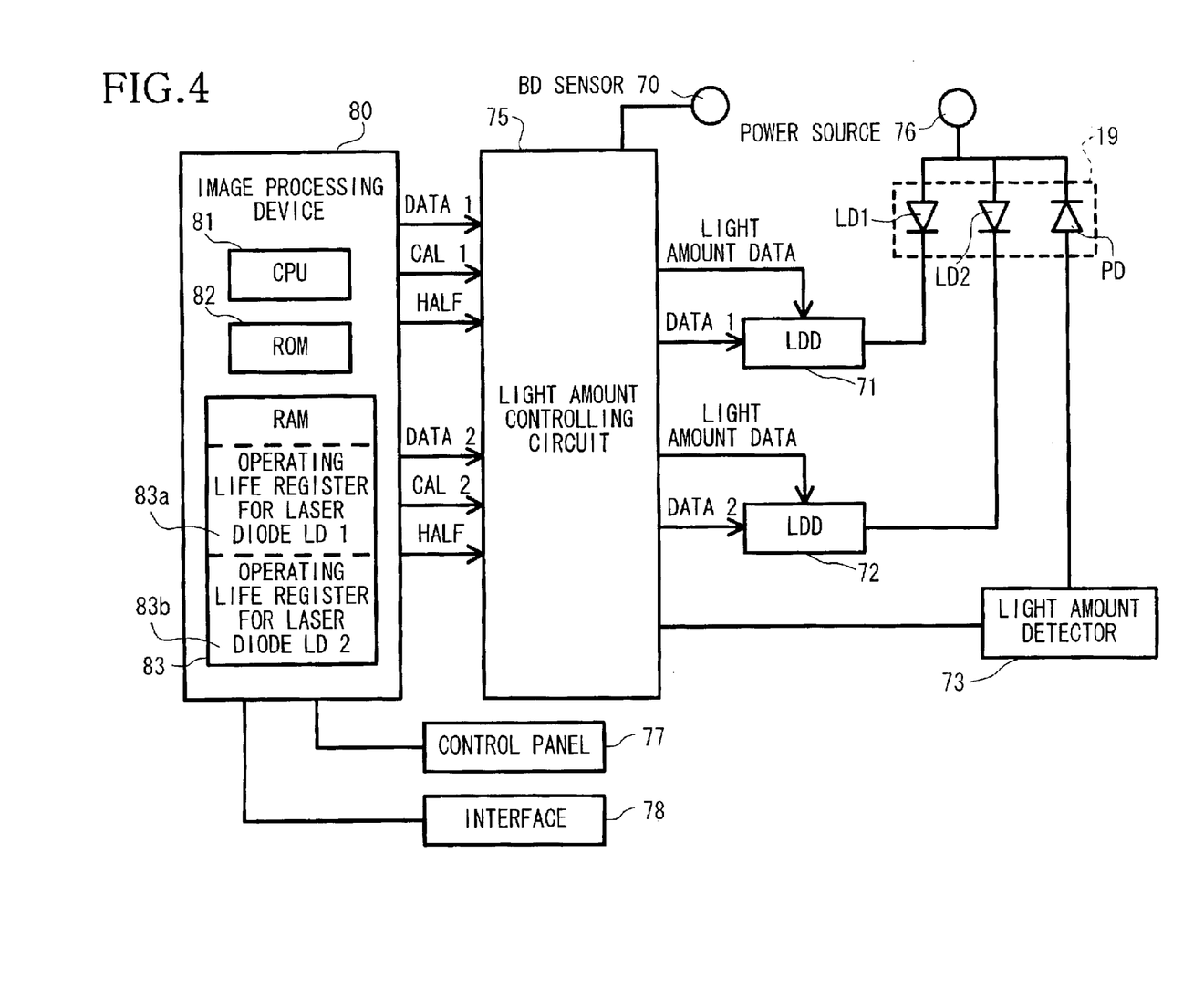
FIG. 4 is a block diagram illustrating structures of a control system for the scanner unit.

The scanner unit 16 is provided in an upper portion of the main casing 2 and below a discharge tray 46. The scanner unit 16 includes a laser diode array 19 (shown in FIG. 3), a polygon mirror 20 that is driven to spin, lenses 21 and 23, and a reflecting mirror 22. The laser diode array 19 includes two laser diodes LD1, LD2, as shown in FIG. 4, as laser light emitting portions. A beam of laser light emitted from each of the laser diodes LD1, LD2 passes through or reflects off the polygon mirror 20, the lens 21, the reflecting mirror 22, and the lens 23 in this order, as indicated by broken lines in FIG. 1, to scan at high speed across a surface of a photosensitive drum 27, in the process unit 17.

Figure 2:
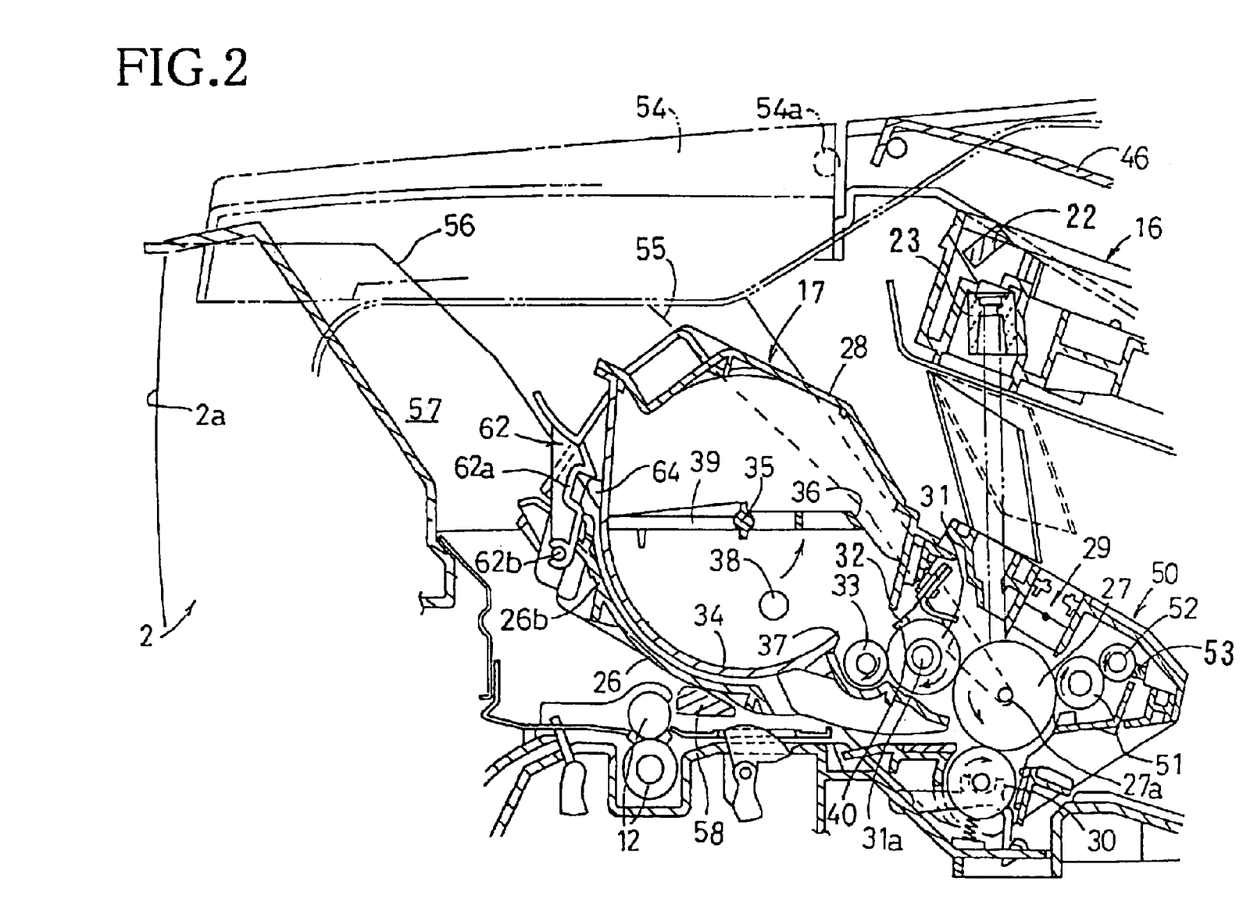
FIG. 2 is an enlarged side cross-sectional view showing essential parts of an image forming unit of the laser printer.

As shown in FIG. 2, the process unit 17 includes a photosensitive member cartridge 26. The photosensitive member cartridge 26 includes the photosensitive drum 27, a scorotron charger 29, a transfer roller 30, a cleaning roller 51 as a paper powder cleaning device, a secondary roller 52 and a slide member 53.

In the laser printer 1, residual toner remaining on the surface of the photosensitive drum 27 after the toner is transferred by the transfer roller 30 onto the sheet 3, is collected by a developing roller 31. This toner collection manner is a so called cleaner-less system in which a blade for wiping out the residual toner and a residual toner container can be eliminated. Therefore, the overall arrangement of the laser printer 1 can be simplified. In addition, the physical size and costs of the laser printer 1 can be reduced.

The photosensitive drum 27 is provided to a side of the developing roller 31 as a developing device, to face the developing roller 31. The photosensitive drum 27 is rotatable in a counterclockwise direction as indicated by the arrow in FIG. 2. The photosensitive drum 27 includes a main drum which is grounded. The surface (photosensitive layer) of the photosensitive drum 27 is formed of positively chargeable photosensitive layer including, for example, an amorphous silicon-based material, such as σ-Si:H, a cadmium sulfide-based material, such as Cds, a zinc oxide based-material, such as ZnO, a selenium-based material, such as AsSe3, or an organic photosensitive material, such as polycarbonate. A rotating shaft 27a, which is a driving shaft of the photosensitive drum 27, protrudes from the right and left sides of the photosensitive member cartridge 26. The rotating shaft 27a is rotatably driven by a power transmitted from a main motor (not shown).

The scorotron charger 29 is disposed above the photosensitive drum 27 with a predetermined distance therebetween, to prevent the scorotron charger 29 from contacting the photosensitive drum 27. The scorotron charger 29 is a positively charging charger that generates corona discharge from a charging wire made from tungsten or other material. The scorotron charger 29 uniformly and positively charges the surface of the photosensitive drum 27. A charging power source (not shown) turns on and off the scorotron charger 29.

The laser light emitted from the scanner unit 16 scans at high speed across the surface of the photosensitive drum 27, which is uniformly and positively charged by the scorotron charger 29. The surface of the photosensitive drum 27 is selectively exposed to the laser light. An electrostatic latent image is formed on the photosensitive drum 27 based on image data.

The transfer roller 30 is disposed below the photosensitive drum 27 to face the drum 27. The transfer roller 30 is supported in the photosensitive member cartridge 26 so as to rotate in a clockwise direction as indicated by the arrow in FIG. 2. The transfer roller 30 includes a metal roller shaft covered by a roller portion formed of an ionic conductive rubber material. A transfer bias is applied to the transfer roller 30 from a transfer bias application power source (not shown). Accordingly, the visible toner image on the photosensitive drum 27 is transferred onto the paper sheet 3 while the paper sheet 3 passes between the photosensitive drum 27 and the transfer roller 30.

A developing cartridge 28 used as a developing unit, is detachably mounted on the photosensitive member cartridge 26. The developing cartridge 28 includes the developing roller 31, a toner layer thickness regulating blade 32, a toner supply roller 33, and a toner box 34.

The toner box 34 accommodates a positively chargeable non-magnetic single component toner, as a developing agent. The toner is, for example, a polymerized toner that is obtained by copolymerizing polymerizable monomers using a known polymerization method, such as a suspension polymerization method. The polymerizable monomers may be styrene-based monomers, such as styrene, and acrylic-based monomers, such as acrylic acid, alkyl (C1–C4) acrylate, and alkyl (C1–C4) methacrylate. Polymerized toner particles are spherical in shape, and thus have excellent fluidity. A coloring material, such as carbon black, and wax, as well as silica as an external additive are added to the toner particles to improve the fluidity of the toner. A toner particle size is approximately 6 to 10 $\mu$m.

Disposed in a substantially central portion of the toner box 34 is a rotating shaft 35. The rotating shaft 35 supports an agitator 36 that agitates the toner in the toner box 34 as the agitator 36 rotates in a counterclockwise direction as indicated by the arrow in FIG. 2. The toner is discharged from a toner supply opening 37 provided in the toner box 34. Provided in a side wall of the toner box 34 is a window 38 for detecting the amount of toner remaining in the toner box 34. The window 38 is cleaned by a cleaner 39 supported by the rotating shaft 35.

The toner supply roller 33 is disposed to a side of the toner supply opening 37 and rotates in a clockwise direction as indicated by the arrow in FIG. 2. The developing roller 31 is disposed in contact with the toner supply roller 33 and rotates in a clockwise direction as indicated by the arrow in FIG. 2. The toner supply roller 33 and the developing roller 31 contact each other so as to apply some pressure to each other.

The toner supply roller 33 includes a metal roller shaft covered by a roller portion formed of a conductive foam material. The developing roller 31 includes a metal roller shaft covered by a roller portion formed of a conductive rubber material. More specifically, the roller portion of the developing roller 31 is formed of conductive urethane rubber or silicone rubber including fine carbon particles. A surface of the roller portion of the developing roller 31 is coated with urethane rubber or silicone rubber including fluorine. A developing bias is applied to the developing roller 31 from a developing bias application power source (not shown).

Disposed adjacent to the developing roller 31 is the toner layer thickness regulating blade 32 that regulates the thickness of the toner layer on the developing roller 31. The regulating blade 32 includes a blade portion formed of a metal plate spring and a contact portion 40 attached to one end of the blade portion. The contact portion 40 has a semicircular cross-sectional shape and is formed of insulating silicone rubber. The other end of the blade portion is supported near the developing roller 31 by the developing cartridge 28. The contact portion 40 presses the developing roller 31 with the elasticity of the plate spring.

The toner discharged through the toner supply opening 37 is supplied onto the toner supply roller 33 and further onto the developing roller 31 by the rotation of the toner supply roller 33. The toner is positively charged through friction charging at a contact portion of the toner supply roller 33 and the developing roller 31. As the developing roller 31 rotates, the toner supplied onto the developing roller 31 enters between the contact portion 40 of the regulating blade 32 and the developing roller 31 where the toner is again charged through friction charging, to a sufficient degree. The toner passing between the contact portion 40 and the developing roller 31 is formed into a uniform-thickness thin toner layer on the developing roller 31.

Thereafter, in accordance with the rotation of the developing roller 31, the toner carried on the developing roller 31 and charged with positive polarity is deposited on the electrostatic latent image formed on the photosensitive drum 27, thereby making the image visible. In other words, the toner is supplied to parts of the photosensitive drum 27 selectively exposed to the laser light where the potential level is lower than the remaining part of the photosensitive drum surface uniformly positively charged. Thus, a visible toner image is formed on the photosensitive drum 27.

As shown in FIG. 1, the fixing unit 18 is disposed downstream of the process unit 17 in the sheet feeding direction. The fixing unit 18 includes a heat roller 41 and a pressure roller 42 that is pressed against the heat roller 41, as well as a pair of feeding rollers 43 disposed downstream of the heat roller 41 and the pressure roller 42 in the sheet feeding direction. The heat roller 41 is formed of metal and is provided with a halogen lamp as a heat source. When the sheet 3, which has the toner transferred thereon in the process unit 17, passes between the heat roller 41 and the pressure roller 42, the toner is fused by heat to fixedly adhere the toner to the sheet 3. After the toner is fixedly adhered to the sheet 3, the sheet 3 is provided by the feeding rollers 43, to a discharge path 44. The sheet 3 is fed to discharge rollers 45, through the discharge path 44, and is discharged onto the discharge tray 46 by the discharge rollers 45.

Exemplary embodiments of the scanner unit 16 will be described below. As shown in FIG. 3, the polygon mirror 20 is driven by a polygon motor (not shown) so as to rotate about a rotating shaft 20*a*. In accordance with the rotation of the polygon mirror 20, the beam of the laser light emitted from the laser diode array 19 scans in an axial direction of the photosensitive drum 27 (in the main scanning direction), across the surface of the photosensitive drum 27, through the lenses 21, 23 and the reflecting mirror 22. A beam detecting (BD) sensor 70 for determining scanning timing is disposed to a side of a scanning area. The BD sensor 70 receives a beam of the laser light that reaches a region out of a printable area of the sheet 3 used in the laser printer 1.

As shown in FIG. 4, the laser diode array 19 includes two laser diodes LD1, LD2, and a photodiode PD for detecting an amount of the laser light emitted from the laser diodes LD1, LD2. The beam of the laser light emitted from each of the laser diodes LD1, LD2 is slightly shifted from each other in a sub scanning direction, reaching the surface of the photosensitive drum 27. Accordingly, the surface of the photosensitive drum 27 is scanned with the laser light, two lines at a time.

The laser diodes LD1, LD2 are driven by laser diode drivers (LDDs) 71, 72, respectively. The current that passes through the photodiode PD in response to the intensity of the light beam that the photodiode PD receives, is detected by a photodiode light amount detector 73. The LDDs 71, 72, the light amount detector 73, and the BD sensor 70 communicate with a light amount controlling circuit 75.

An anode of the laser diodes LD1, LD2 is connected to a power source 76. When an output level of the LDD 71, LDD 72 is low, the current is supplied to the laser diode LD1, LD2. Accordingly, the laser diodes LD1, LD2 emit the laser light. An amount of the light emitted from the laser diodes LD1, LD2 is associated with the current that passes therethrough. The LDDs 71 and 72 input thereto from the light amount controlling circuit 75, Data 1 and Data 2 pulse signals, respectively, that makes a transition to LOW or HIGH in association with print data, as well as light amount data indicating the value of current that passes through the laser diodes LD1, LD2 when the laser diodes LD1, LD2 emit the light.

The light amount controlling circuit 75 communicates with an image processing device 80 that communicates with a control panel 77 provided on the main casing 2 and an interface 78 through which the print data from an external device, such as a personal computer (PC) is input. The image processing device 80 includes a central processing unit (CPU) 81, a read-only memory (ROM) 82, and a random-access memory (RAM) 83. The image processing device 80 generates and outputs rectangular Data 1 and Data 2 pulses, based on the print data input from the PC through the interface 78. The image processing device 80 also outputs Cal 1 and Cal 2 pulse signals for providing timing for the photodiode PD to detect the laser light emitted from the laser diodes LD1, LD2, and a Half signal for reducing the amount of the laser light emitted from the laser diodes LD1, LD2 to half of a normal light emitting amount. The Data 1, Data 2, Cal 1, Cal 2, and Half signals are input to the light amount controlling circuit 75.

The RAM 83 in the image processing device 80 includes an operating life register 83*a* for the laser diode LD1 that stores data on an operating life of the laser diode LD1, and an operating life register 83*b* for the laser diode LD2 that stores data on an operating life of the laser diode LD2. The image processing device 80 performs following operations based on the data stored in the operating life registers 83*a*, 83*b* for the laser diodes LD1, LD2, respectively.

Figure 5:
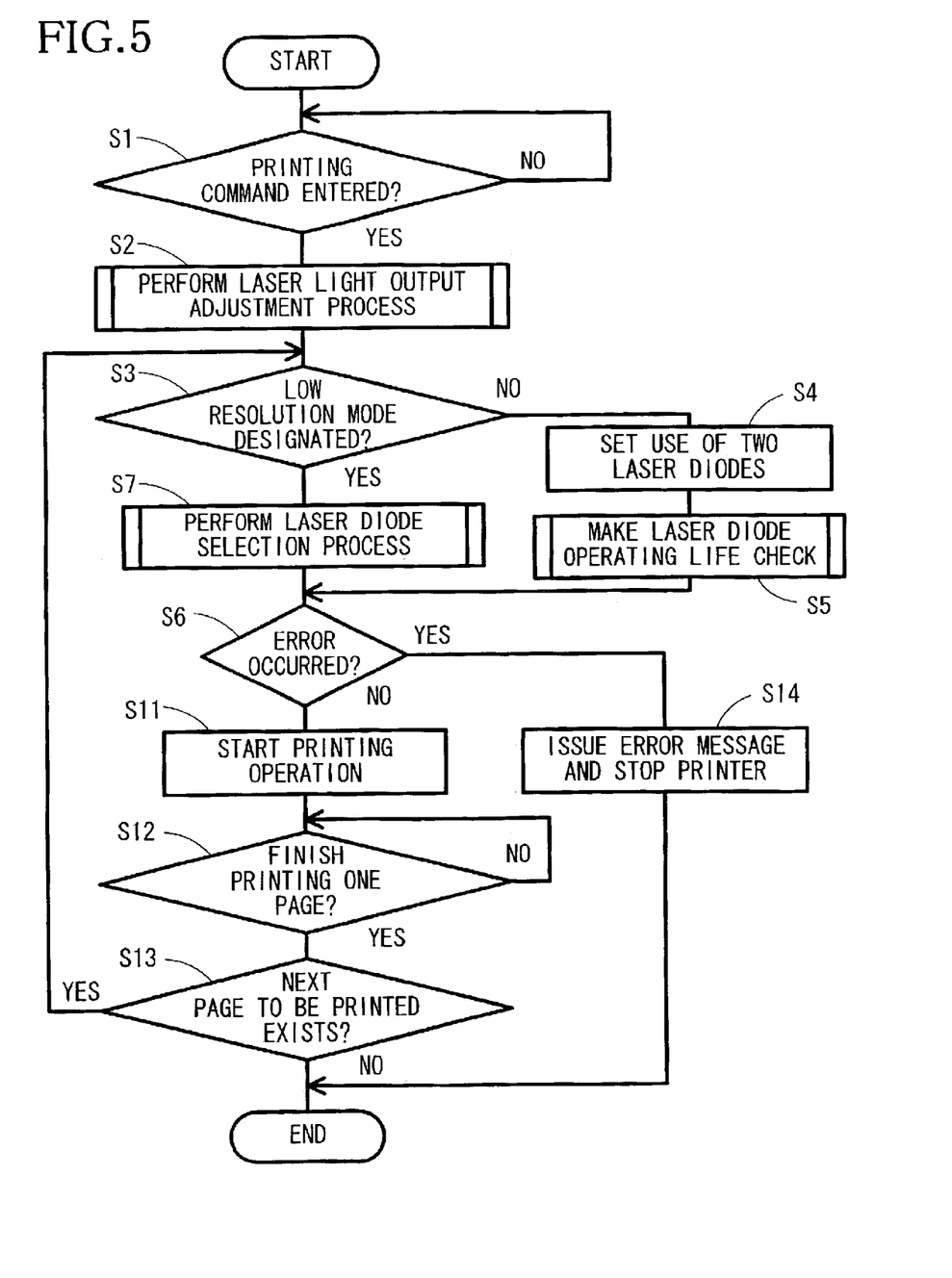
FIG. 5 is a flowchart illustrating a main routine performed by the control system.
Figure 6:
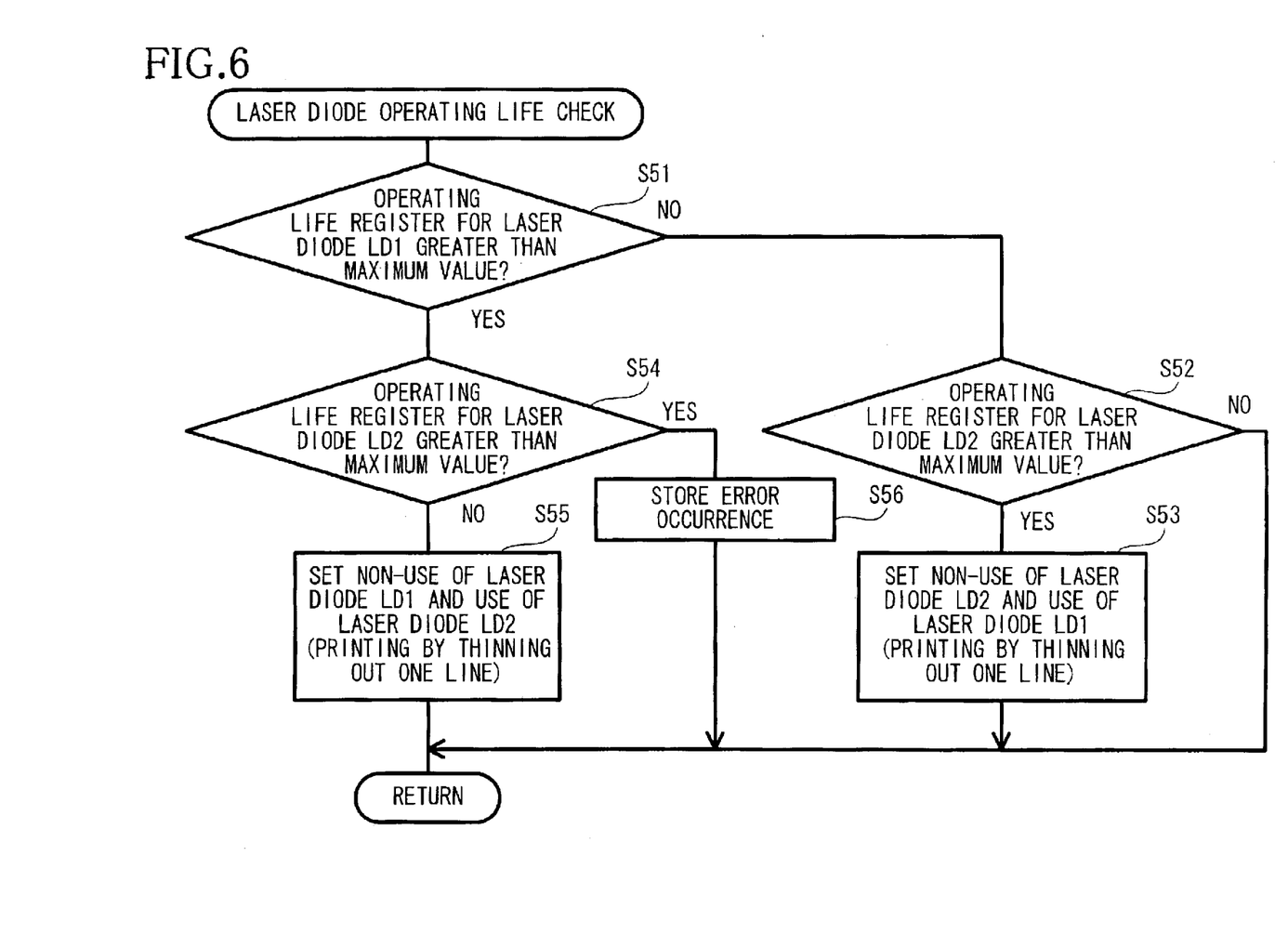
FIG. 6 is a flowchart illustrating a laser diode operating life check made during the main routine.
Figure 7:
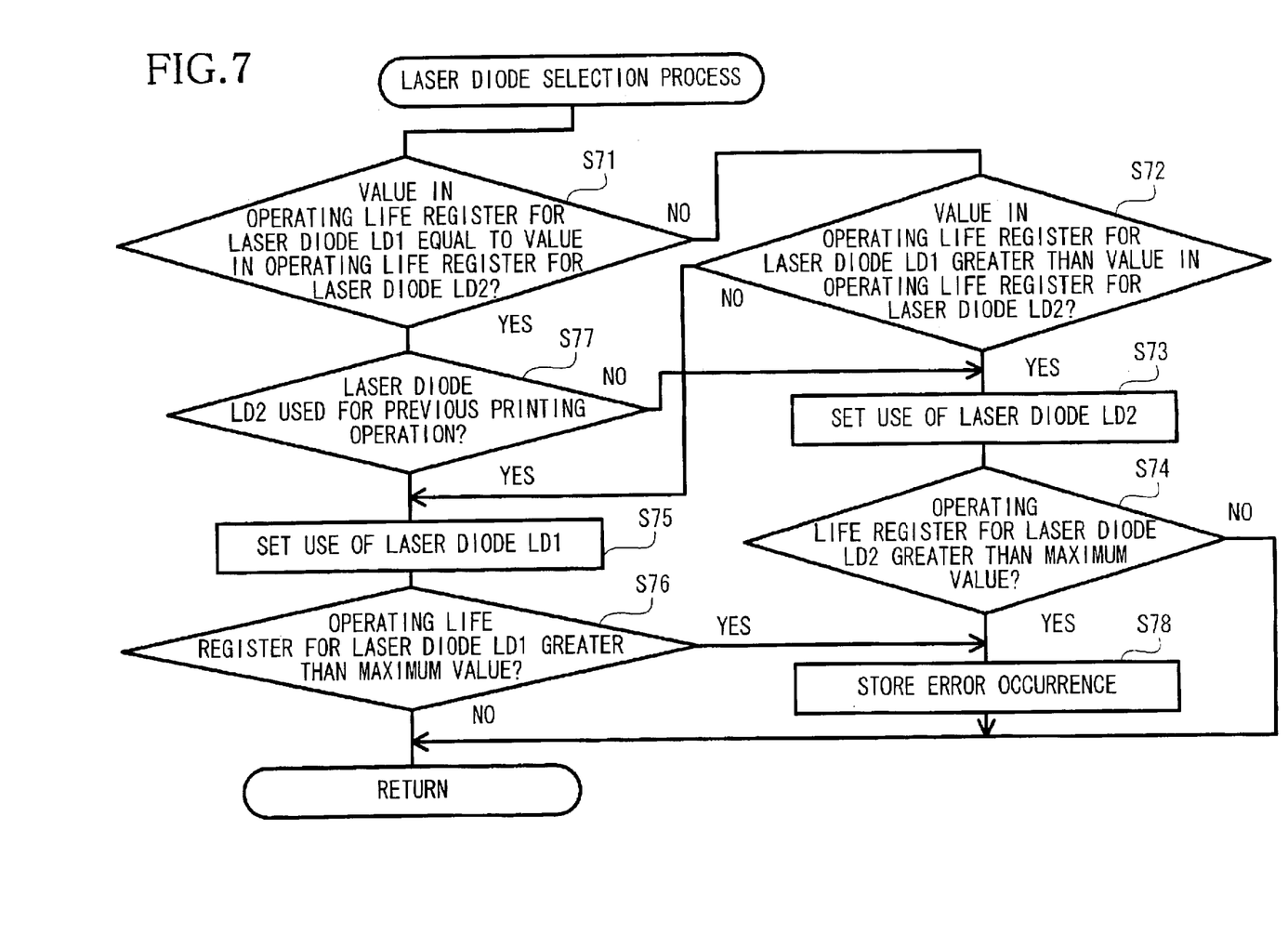
FIG. 7 is a flowchart illustrating a laser diode selection process made during the main routine.

FIGS. 5 to 7 show flowcharts that the image processing device 80 performs. When the laser printer 1 is turned on, the image processing device 80 starts the main routine shown in FIG. 5. In step S1, it is determined whether a print command is entered as print data is input through the interface 78. When the print command is not entered (S1: NO), flow waits in step S1 for the print command to be entered. When the print command is entered (S1: YES), flow proceeds to step S2 where a laser light output adjustment process is performed. The laser light output adjustment process will be described in detail below with reference to FIG. 8.

Figure 8:
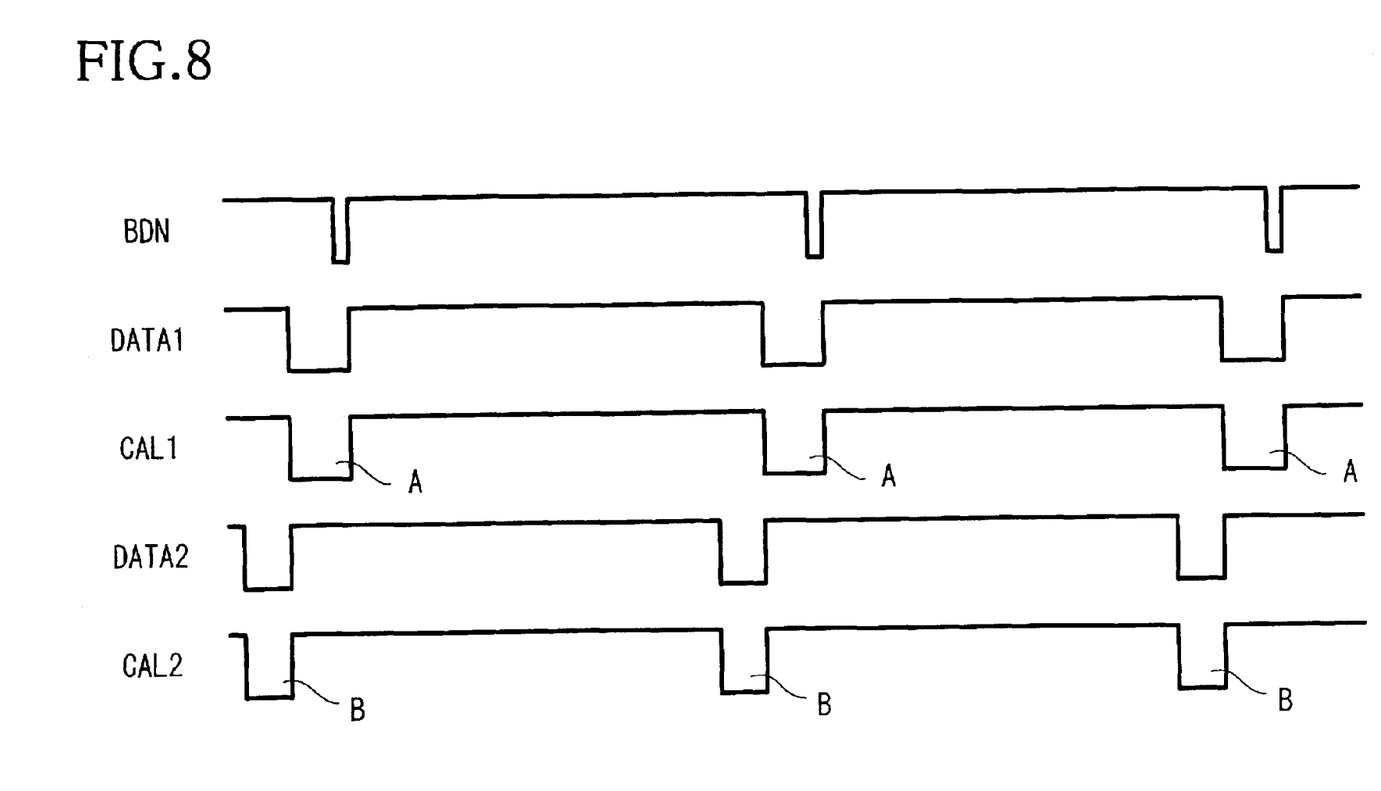
FIG. 8 is a time chart illustrating changes of various signals in a laser light output adjustment process performed during the main routine.

FIG. 8 is a time chart showing changes of various signals during the laser light output adjustment process. As shown in FIG. 8, the image processing device 80 outputs low Data 2 and Data 1 rectangular pulses in this order at an interval that the polygon mirror 20, which starts to rotate as the power is turned on, is rotated 60 degrees.

As shown in FIG. 3, the polygon mirror 20 according to the embodiment is substantially regular hexagonal when viewed from the top. Each of the six sides of the polygon mirror 20 has a mirror finished surface. One side of the polygon mirror 20 is associated with one scanning line on the photosensitive drum 27.

While the polygon mirror 20 is rotated 60 degrees, a surface of the photosensitive drum 27 is scanned with the laser light beam in one way along a longitudinal direction of the photosensitive drum 27.

When the Data 2 or Data 1 pulse signal is turned into LOW, the laser diode LD2 or LD1 emits the laser light, as described above. The low rectangular Data 2 and Data 1 pulses are sequentially output at the timing that the laser light emitted from the laser diodes LD2, LD1 are reflected off the polygon mirror 20 and directed to a region outside the printable area toward the BD sensor 70. The low Data 1 pulse is output longer to ensure the BD sensor 70 to detect the laser light emitted from the laser diode LD1. A signal output by the BD sensor 70 is shown as BDN in FIG. 8. Based on the BDN signals, output timings of the Data 1 and Data 2 pulses are determined.

The image processing device 80 outputs low Cal 1 and Cal 2 rectangular pulses, in synchronization with the output of the low Data1 and Data2 pulses, respectively. When the low Cal 1 and Cal 2 pulses are output, an adjustment is made to the light amount data based on the intensity of the light detected by the light amount detector 73 in order for the laser diodes LD1, LD2 to emit the laser light at a predetermined intensity. For example, at a timing indicated by "A" in FIG. 8, a value of the current supplied to the laser diode LD1 is adjusted such that the laser diode LD1 emits the beam of the laser light at the predetermined intensity. At a timing indicated by "B" in FIG. 8, a value of the current supplied to the laser diode LD2 is adjusted such that the laser diode LD2 emits the beam of the laser light at the predetermined intensity.

The thus adjusted values of the current are stored in a predetermined area of the RAM 83, as well as in the operating life registers 83a, 83b for the laser diodes LD1, LD2. As a total light emitting time of a laser diode increases, a current required for the laser diode to emit the light at a predetermined intensity also increases. In this embodiment, the values of the current after being adjusted are used as parameters for determining the end of the operating life of the laser diodes LD1, LD2.

When the Cal 1 and Cal 2 pulses are output, voltage or power applied to the laser diodes LD1, LD2 may be adjusted instead of current. The values of the voltage or power after being adjusted may be stored in the operating life registers 83a, 83b for the laser diodes LD1, LD2. The values of current, voltage, or power properly reflect the substantial operating life of each of the laser diodes LD1, LD2, which generally have some quality variances between the laser diodes LD1, LD2.

Referring back to FIG. 5, after the laser light output adjustment process is performed in step S2, the process continues to step S3 whether it is determined whether a low resolution mode is designated using the control panel 77 of the laser printer 1 or the PC. When the low resolution mode is not designated (S3: NO), the number of the laser diodes to be used for scanning is set to two in step S4 to use both laser diodes LD1, LD2. Thereafter, a laser diode operating life check is made in step S5.

The laser diode operating life check will now be described in detail with reference to FIG. 6. In step S51, it is determined whether the current value stored in the operating life register 83a for the laser diode LD1 is greater than a maximum allowable current value (hereinafter referred to as the maximum value). More specifically, as the total light emitting time of the laser diode LD1 becomes longer, that is, as the laser diode LD1 approaches the end of its operating life, a current value to be stored in the operating life register 83a becomes greater. Accordingly, it is determined in step S51 whether the value stored in the operating life register 83a exceeds the maximum value and the life of the laser diode LD1 has expired.

When the value stored in the operating life register 83a for the laser diode LD1 is equal to or less than the maximum value (S51: NO), it is determined in step S52 whether the value stored in the operating life register 83b for the laser diode LD2 is greater than the maximum value. When the value stored in the operating life register 83b is equal to or less than the maximum value (S52: NO), flow proceeds to step S6 shown in FIG. 5. In other words, the operating life of each laser diode LD1, LD2 has not yet expired, so that the laser diodes LD1, LD2 can be both usable. Thus, the setting made in step S4 to use both laser diodes LD1, LD2 can be maintained.

In step S52, when it is determined that the value stored in the operating life register 83b for the laser diode LD2 exceeds the maximum value and the operating life of the laser diode LD2 has expired (S52: YES), flow proceeds to step S53 where non-use of the laser diode LD2 and use of the laser diode LD1 are set. Thereafter, flow proceeds to step S6 in FIG. 5. Accordingly, the laser diode LD2 whose life has expired is not used. Using only the laser diode LD1, a printing operation is carried out at substantially a lower resolution, while one line is being thinned out or skipped, even when the low resolution mode is not designated.

In step S51, when it is determined that the value stored in the operating life register 83a for the laser diode LD1 exceeds the maximum value and the life of the laser diode LD1 has expired (S51: YES), flow proceeds to step S54 where it is determined whether the value stored in the operating life register 83b for the laser diode LD2 exceeds the maximum value. When the value stored in the operating life register 83b is equal to or less than the maximum value (S54: NO), non-use of the laser diode LD1 and use of the laser diode LD2 are set in step S55. Thereafter, flow proceeds to step S6 in FIG. 5. Accordingly, the laser diode LD1 whose life has expired is not used. Using only the laser diode LD2, the printing operation is carried out at substantially a lower resolution, while one line is being thinned out or skipped, even when the low resolution mode is not designated.

When it is determined that the operating life of the laser diode LD1 has expired (S51: YES) and then determined that the value stored in the operating life register 83b for the laser diode LD2 exceeds the maximum value (S54: YES), neither laser diodes LD1 nor LD2 can be used, because the operating lives of both of the laser diodes LD1, LD2 have expired. In this case, an error occurrence is stored in the RAM 83 in step S56 and then flow proceeds to step S6.

Referring back to FIG. 5, when the low resolution mode is designated (S3: YES), flow proceeds to step S7 where a laser diode selection process is performed to select which laser diode LD1 or LD2 is used for scanning. Then, flow proceeds to step S6.

The laser diode selection process performed in step S7 will be described in detail with reference to a flowchart shown in FIG. 7. In step S71, it is determined whether the value stored in the operating life register 83a for the laser diode LD1 is equal to the value stored in the operating life register 83b for the laser diode LD2. When the values stored in the operating life registers 83a, 83b are not equal (S71: NO), flow proceeds to step S72 where it is determined whether the value stored in the operating life register 83a for the laser diode LD1 is greater than the value stored in the operating life register 83b for the laser diode LD2.

When the value in the operating life register 83a is greater than the value in the operating life register 83b(S72: YES), flow proceeds to step S73 where the use of the laser diode LD2 is set. In the subsequent step S74, it is determined whether the value in the operating life register 83b exceeds the maximum value. When it is determined that the value in the register 83b does not exceed the maximum value (S74: NO), flow proceeds to step S6 in FIG. 5. Thus, use of the laser diode LD2 associated with the operating life register 83b storing the smaller value, is selected for scanning.

In step S72, when the value in the operating life register 83a for the laser diode LD1 is not greater than the value in the operating life register 83b for the laser diode LD2 (S72: NO), flow proceeds to step S75 where the use of the laser diode LD1 is set. Thereafter, in the step S76, it is determined whether the value in the operating life register 83a for the laser diode LD1 exceeds the maximum value. When it is determined that the value in the register 83a does not exceed the maximum value (S76: NO), flow proceeds to step S6 in FIG. 5. Thus, use of the laser diode LD1 associated with the operating life register 83a storing the smaller value, is selected for scanning.

When the values stored in the operating life registers 83a, 83b for the laser diodes LD1, LD2 are equal (S71: YES), flow proceeds to step S77 where it is determined whether the laser diode used for a previous printing operation performed using either laser diode LD1 or LD2 is the laser diode LD2. When it is determined that the laser diode LD2 was used for the previous printing operation (S77: YES), flow proceeds to step S75 where the use of the laser diode LD1 is set. When it is determined that the laser diode LD2 was not used for the previous printing operation (S77: NO), flow proceeds to step S73 where the use of the laser diode LD2 is set. In other words, when the values stored in the operating life registers 83a, 83b are equal (S71: YES), the laser diodes LD1, LD2 are alternatively selected.

In step S74, when it is determined that the value in the operating life register 83b for the laser diode LD2 exceeds the maximum value (S74: YES), an error occurrence is stored in the RAM 83 in step S78, because the value stored in the operating life register 83a for the laser diode LD1 also exceeds the maximum value, that is, the operating live of both of the laser diodes LD1, LD2 have expired. Thereafter, flow proceeds to step S6 in FIG. 5.

Similarly, in step S76, when it is determined that the value in the operating life register 83a for the laser diode LD1 exceeds the maximum value (S76: YES), an error occurrence is stored in the RAM 83 in step S78, because the value stored in the operating life register 83b for the laser diode LD2 also exceeds the maximum value, that is, the operating lives of both of the laser diodes LD1, LD2 have expired. Thereafter, flow proceeds to step S6 in FIG. 5.

Referring back to FIG. 5, when flow proceeds to step S6 after step S5 or S7, it is determined whether the error occurrence is stored in the RAM 83 in step S56 in the laser diode operating life check in step S5, or in step S78 in the laser diode selection process in step S7. When the error occurrence is stored in step S56 or S78 (S6: YES), flow proceeds to step S14 where an error message is output to the control panel 77 and the laser printer 1 is stopped, whereupon the process flow ends.

When the error occurrence is not stored in the RAM 83 (S6: NO), flow proceeds to step S11 where a print start is instructed. Thereafter, the printing operation is started in accordance with another routine (not shown), using both or one of the laser diodes LD1, LD2.

Figure 9:
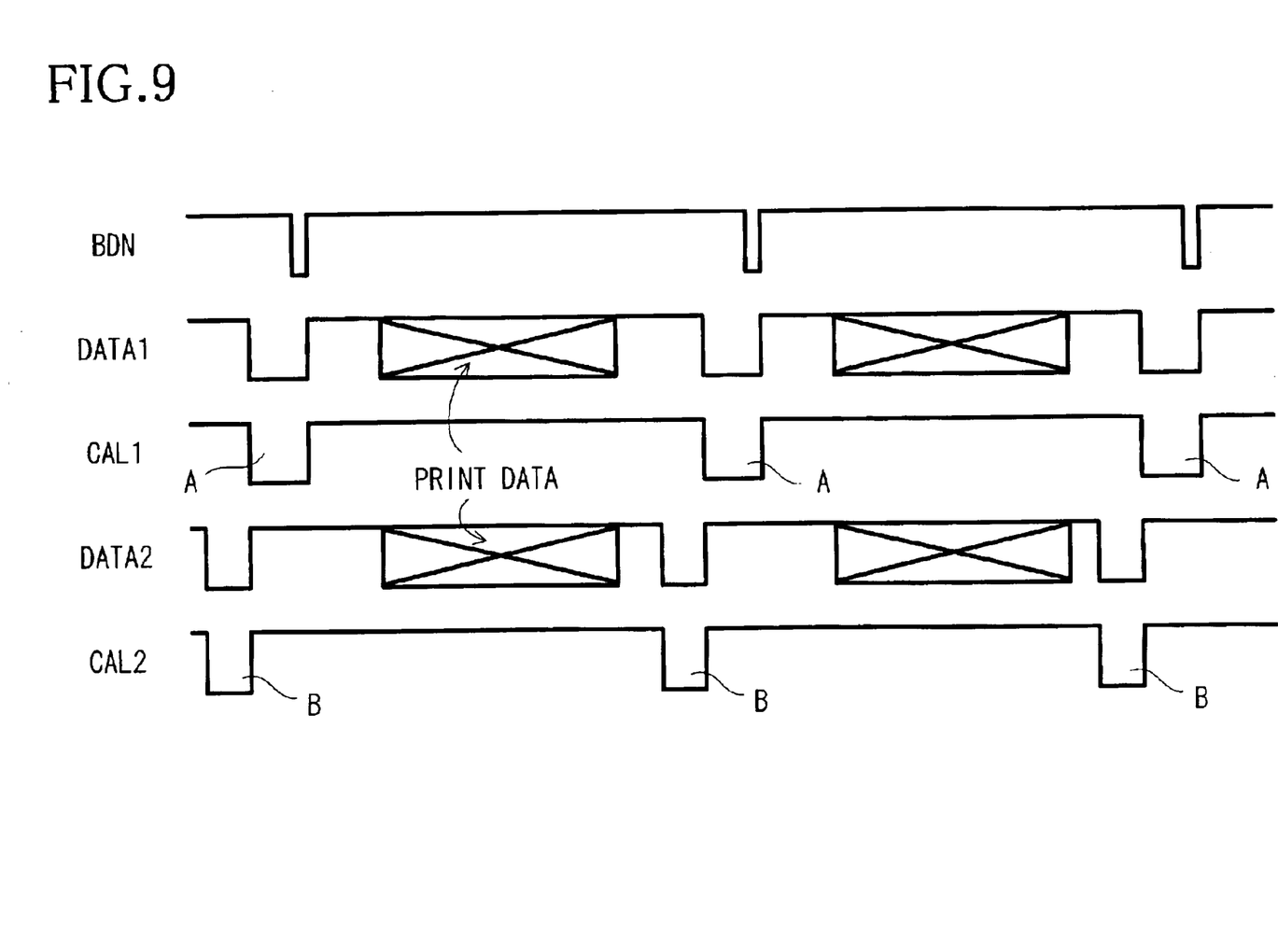
FIG. 9 is a time chart illustrating changes of various signals in a printing operation performed during the main routine.

FIG. 9 is a time chart showing changes of various signals when the printing operation is performed using both laser diodes LD1, LD2. The low Data 2 pulse is output at the time when the beam of laser light emitted from the laser diode LD2 reaches an area of the photosensitive drum 27 associated with a region outside of the printable area. The low Data 1 pulse is output at the time when the Data 2 pulse signal makes a LOW to HIGH transition.

Based on the Data 1 and Data 2 pulses, the laser diodes LD1, LD2 emit the laser light. At the time the laser diodes LD1, LD2 emit the laser light, the low Cal 1 and Cal 2 pulses are output in synchronization with the Data 1 and Data 2 pulses, respectively. At this time, the amounts of laser light emitted from the laser diodes LD1, LD2 are detected by the light amount detector 73. Based on the detected light emitting amounts, the light amount controlling circuit 75 determines the current to be supplied to the laser diodes LD1, LD2 by the driving of the LDD1, LDD2. The determined current values are stored in the operating life registers 83a, 83b for the laser diodes LD1, LD2.

The beam of the laser light emitted from the laser diode LD1 in accordance with the low Data 1 rectangular pulses, is detected by the BD sensor 70. Based on the detection the laser beam by the BD sensor 70, a BDN rectangular pulse is output. Detection by the light amount controlling circuit 75 of a falling edge of the BDN pulse output from the BD sensor 70 triggers the output of the Data 1, Data 2 pulse signals for one line to the LDD1, LDD2. More specifically, the light amount controlling circuit 75 outputs the Data 1, Data 2 pulse signals for one line to the LDD1, LDD2, in accordance with the Data 1, Data 2 pulse signals that are output from the image processing device 80 based on image data. In FIG. 9, the Data 1, Data 2 pulse signals for one line is indicated by "X", and the transitions of the pulse signals are not specified for the simplicity of the illustration. In practice, the Data 1, Data 2 pulse signals make fine transitions from LOW to HIGH and vice versa, in accordance with the image data.

When the Data 1, Data 2 pulse signals output from the LDD1, LDD2 make a transition to LOW, the laser beams are emitted from the respective laser diodes LD1, LD2. The laser beams emitted from the laser diodes LD1, LD2 are reflected off the polygon mirror 20 and scan across the surface of the photosensitive drum 27.

When the Data 1, Data 2 pulse signals for one line are completely output based on the image data, the light amount controlling circuit 75 again outputs the low Data 2 rectangular pulse, and then low Data 1 rectangular pulse at the timing when the Data 2 pulse makes a LOW to HIGH transition, as described above. The pulse signals are thus output repeatedly during the printing operation.

Referring back to FIG.5, in step S12, when printing for one page is finished (S12: YES), it is determined in step S13 whether there is another page to be printed. When there is another page to be printed (S13: YES), flow returns to step S3 and the abovedescribed process steps are repeated. When there is no page to be printed (S13: NO), flow ends.

FIG. 9 shows the time chart when both laser diodes LD1, LD2 are used. In the case where only a single laser diode LD1 or LD2 is used, the laser diode LD1 or LD2, whichever is used, may be controlled in accordance with the Data 1 and Cal 1 pulse signals. In this case, an output timing of a falling edge of the low Data 1 pulse, may be the same as the output timing of that of the low Data 2 pulse shown in FIG. 9, or slightly thereafter.

In the laser printer 1 according to the embodiment, for the printing operation using only one of the laser diodes LD1, LD2, the values stored in the operating life registers 83a, 83b are compared. Based on the comparison result, driving of the laser diode LD1, LD2 associated with the operating life register 83a, 83b storing the greater value, that is, the driving of the laser diode LD1, LD2 having the shortest operating life, is stopped. Accordingly, both laser diodes LD1, LD2 become unusable at timings close to each other.

The laser diode array 19 is normally soldered onto a printed circuit board. When the laser diode LD1, LD2 becomes unusable, replacement of the printed circuit board, the scanner unit 16, or the laser printer 1 is required. In the case where a laser printer includes a plurality of laser diodes, like the laser printer 1 according to the embodiment, if one of the laser diodes becomes unusable, other usable laser diodes also have to be replaced with new ones together with the unusable laser diode. However, in the laser printer 1 according to the embodiment, the usable laser diode LD1 or LD2 is not wasted, because the laser printer 1 is controlled such that a plurality of the laser diodes LD1, LD2 become unusable at the timings close to each other. Thus, the best possible use of the laser diodes LD1, LD2 during their usable periods, may be made without wasting any of the usable laser diode LD1 or LD2.

When only one laser diode LD1 or LD2 is used for the printing with the laser printer 1, the values stored in the operating life registers 83a, 83b are compared. Based on the comparison result, driving of the laser diode LD1, LD2 associated with the operating life register 83a, 83b storing the greater value is stopped, as described above. Therefore, a specific laser diode is not continuously used or does not become unusable earlier. Thus, the best possible use of the laser diodes LD1, LD2 may be made during their usable periods.

The current values that reflect quality variances among the laser diodes are used for the comparison of an operating life of the laser diodes LD1, LD2. By the use of the current values, the time when the laser diodes LD1, LD2 reach the end of the operating life thereof can be brought close to each other with great accuracy.

While the invention has been described in detail and with reference to the specific embodiment thereof, it would be apparent to those skilled in the art that various changes, arrangements and modifications may be applied therein without departing from the spirit and scope of the invention.

For example, although the operating life registers 83a, 83b write thereinto the current values in the above-described embodiment, the operating life registers 83a, 83b may write thereinto data on the light emitting amount when a predetermined current is supplied to the laser diodes LD1, LD2. In this case, the light emitting amount becomes smaller as the total driving time of the laser diode LD1, LD2 becomes longer. Thus, determination as to which laser diode LD1 or LD2 is closer to the end of the operating life thereof, can be made.

Instead, the operating life registers 83a, 83b may write thereinto the number of image dots formed with the laser diodes LD1, LD2. In this case, the number of dots becomes greater as the total driving time of the laser diode LD1, LD2 becomes longer. Thus, it may be determined which the laser diode LD1, or LD2 is closer to the end of its operating life.

Thus, a comparison process using the number of dots may be simplified as compared with that using the current values.

A driving amount of the laser diode LD1 during a period associated with the low Cal 1 pulse is slightly greater than that of the laser diode LD2 during a period associated with the low Cal 2 pulse, because the Cal 1 pulse is longer than the Cal 2 pulses. However, the difference in the driving amounts of the laser diodes LD1, LD2 is such a negligible amount for the calculation of the number of dots to determine the operating life of the laser diode LD1, LD2.

In the above-described embodiment, when the low resolution mode is designated, the laser diode LD1 or LD2 which is closer to the end of its operating life is prevented from being driven. In the low resolution mode, the density of lines forming an image is reduced. Accordingly, the amount of the toner attached to the photosensitive drum 27 is reduced. Therefore, the low resolution mode refers to a toner saving mode. To save the consumption amount of the toner, the same processes according to the above-described embodiment may be performed.

In the above-described embodiment, when the low resolution mode is designated, the driving of the one of the laser diodes LD1, LD2 is stopped. However, when the low resolution mode or toner saving mode is designated, the photosensitive drum 27 may be exposed to the laser beams emitted from both of the laser diodes LD1, LD2, while an amount of the laser light emitting from one of the laser diodes LD1, LD2 is reduced. Thus, a light exposure amount for the photosensitive drum 27 may be reduced without stopping the driving of one of the laser diodes LD1, LD2. With this structure, deterioration of image quality may be restricted as compared with the case where the driving of one of the laser diodes LD1, LD2 is stopped.

Shortening degree of the operating life of the laser diode LD1, LD2 is lower when one dot image is formed with the light exposure amount being reduced, than when one dot image is formed without reducing the light exposure amount. When the number of dots are used for the determination of the operating life of the laser diodes LD1, LD2, weight needs to be given for the calculation of the number of dots.

The light exposure amount may be reduced, for example, by reducing the current supplied to the laser diodes LD1, LD2, or by reducing the width of a pulse associated with one dot.

In the former case where the current supplied to the laser diodes LD1, LD2 is reduced, the light amount controlling circuit 75 outputs to the LDD1 71 or LDD2 72, the light amount data indicating such current value that reduces the light emitting amount of the laser diode LD1 or LD2 to half, based on the Half signals output from the image processing device 80, as shown in FIG. 4.

Figure 10A:
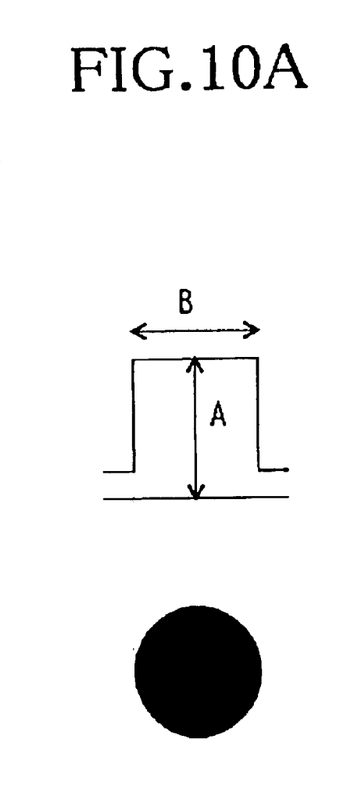
FIGS. 10A to 10C are schematics illustrating techniques to reduce a light exposure amount.
Figure 10B:
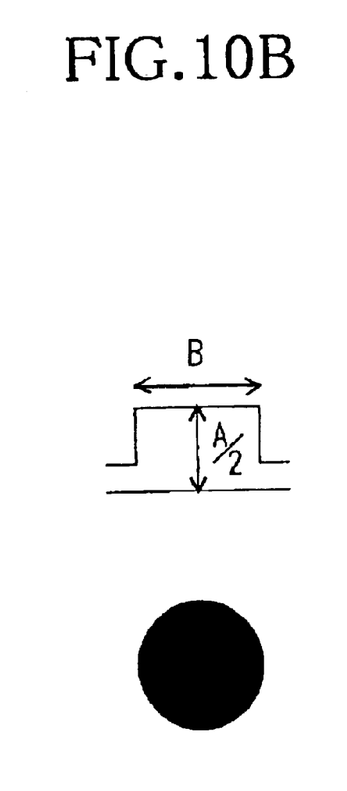

FIG. 10A shows a dot formed by exposing the photosensitive drum 27 to the laser beam emitted from the laser diode LD1, LD2 by the application of normal current A during a period corresponding to a normal pulse width B. FIG. 10B shows a dot formed by exposing the photosensitive drum 27 to the laser beam emitted from the laser diode LD1, LD2 by the application of half of the normal current A during a period corresponding to the normal pulse width B.

When the photosensitive drum 27 is exposed to the laser beam by the application of half of the normal current (A/2), as shown in FIG. 10B, the dot is shaped substantially the same as that formed by the application of the normal current A. However, the amount of the toner attached to the photosensitive drum 27 is reduced and the density of an image becomes lower. In this case, no changes are required for the Data 1, Data 2 rectangular pulses, which are output based on the image data. Only the output from the laser diode is adjusted, and the relatively good image quality is obtained.

In the latter case where the width of a pulse associated with one dot is reduced, the image processing device 80 reduces the width of the Data 1, Data 2 rectangular pulse per dot. No changes in the light amount data indicating the current value are made.

Figure 10C:
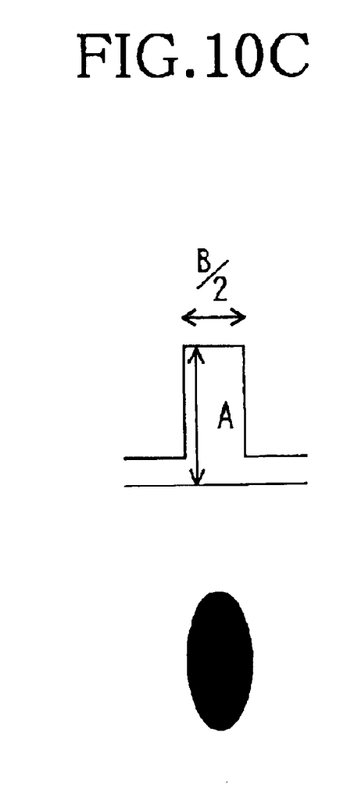

FIG. 10C shows a dot formed by exposing the photosensitive drum 27 to the laser beam emitted from the laser diode LD1, LD2 by the application of the normal current A during a period corresponding to half of the normal pulse width B. As compared with the dot shown in FIG. 10A, the width of the dot shown in FIG. 10C is reduced approximately to half, though the density of the dot is not changed. As the width of the dots is reduced, the density of an image becomes lower and relatively good image quality is not obtained.

In the above-described embodiment, even when the low resolution mode is not designated, the printing operation is performed at low resolution, if one of the laser diodes LD1, LD2 has reached the end of its operating life (S52: YES or S54: NO), by stopping the driving of the laser diode LD1 or LD2 whose operating life has expired. In such case, however, the printing operation may be carried out at higher resolution using the other laser diode LD1 or LD2, whose operating life has not yet expired, by reducing the rotating speed of the photosensitive drum 27 to half.

In steps S53 and S55 shown in FIG. 6, the printing operation is performed by thinning out or skipping one line. Instead, the rotating speed of the photosensitive drum 27 may be reduced to half in steps S53 and S55. In this case, the printing speed becomes slower, though an image can be formed using only one laser diode LD1 or LD2, at the substantially same resolution as that of the image formed using two laser diodes LD1, LD2.

If one of the laser diodes LD1, LD2 has reached the end of its operating life (S52: YES or S54: NO) at the time of printing at the higher resolution, an message may be displayed on the control panel 77 to allow a user to select by the operation or input on the control panel 77, either a low-resolution printing by thinning out or skipping one line, or a high-resolution printing by reducing the rotating speed of the photosensitive drum 27 to half. With this structure, it can be determined according to the user's desire, which of the printing speed or resolution takes precedence over the other.

The invention may be applied to various electrophotographic image forming devices, such as facsimile machines, that include a plurality of laser diodes, other than laser printers. Although the number of the laser diodes used in the above-described embodiment is two, the invention may be applied to image forming devices including three or more laser diodes. In this case, the above-described processes may be performed by focusing on at least two specific laser diodes, so that the times when the at least two specific laser diodes reach the end of the operating life thereof can be brought close to each other.

When the image forming device includes three or more laser diodes, the number of the laser diodes used for the low resolution mode or the toner saving mode may be predetermined. The predetermined number of the laser diodes may be selected from the laser diode having the longer operating life. For example, when an image forming device includes four laser diodes and the number of the laser diodes used for the low resolution mode is set to two, two laser diodes closer to the end of the operating life thereof may not be used, or may be used with the light emitting amount being reduced. If such setting is made that only one laser diode is used for the toner saving mode, the laser diode having the longest operating life may be used, and the other three laser diodes may not be used, or may be used with the light emitting amount being reduced.

What is claimed is:

1. An image forming apparatus, comprising:
   a photosensitive member;
   an exposure device including a plurality of laser emitting elements, each of which irradiates a laser beam onto the photosensitive member to form an electrostatic latent image on the photosensitive member;
   a developing device that supplies a developing agent to the electrostatic latent image to form a visible image; and
   a controller that controls the irradiation of the plurality of laser emitting elements, the controller comprising:
   means for determining which one of the plurality of laser emitting elements is closest to reaching its end of an operating life;
   means for restricting the irradiation of the determined laser emitting element closest to reaching its end of operating life,
   wherein the restricting means reduces current applied to the determined laser emitting element closest to reaching its end of operating life.

2. The image forming apparatus according to claim 1, wherein the restricting means restricts the irradiation when the image forming apparatus is instructed to reduce consumption of the developing agent.

3. The image forming apparatus according to claim 2, wherein the restricting means restricts the irradiation when the image forming apparatus is placed in low-resolution printing mode.

4. The image forming apparatus according to claim 1, wherein the restricting means suspends the irradiation of the determined laser emitting element closest to reaching its end of operating life.

5. The image forming apparatus according to claim 4, wherein the restricting means suspends the irradiation when the image forming apparatus is instructed to reduce consumption of the developing agent.

6. The image forming apparatus according to claim 5, wherein the restricting means suspends the irradiation when the image forming apparatus is placed in low-resolution printing mode.

7. The image forming apparatus according to claim 1, wherein the restricting means reduces the current when the image forming apparatus is instructed to reduce consumption of the developing agent.

8. The image forming apparatus according to claim 7, wherein the restricting means reduces the current when the image forming apparatus is placed in low-resolution printing mode.

9. The image forming apparatus according to claim 1, wherein the determining means determines the end of the operating life of each of the plurality of laser emitting elements based on applied current to each of the plurality of laser emitting elements for a predetermined intensity irradiation.

10. The image forming apparatus according to claim 1, wherein the determining means determines the operating life of each of the plurality of laser emitting elements based on dot numbers formed by the image forming apparatus.

11. The image forming apparatus according to claim 1, wherein the restricting means reduces time length of current applied to the laser emitting element determined closest to reaching its end of operating life.

12. The image forming apparatus according to claim 11, wherein the restricting means reduces the time length when the image forming apparatus is instructed to reduce consumption of the developing agent.

13. The image forming apparatus according claim 12, wherein the restricting means reduces the time length when the image forming apparatus is placed in low-resolution printing mode.

14. An image forming apparatus comprising:

a photosensitive member;

an exposure device including a plurality of laser emitting elements, each of which irradiates a laser beam onto the photosensitive member to form an electrostatic latent image on the photosensitive member;

a developing device that supplies a developing agent to the electrostatic latent image to form a visible image; and a controller that controls the irradiation of the plurality of laser emitting elements, the controller comprising:

means for determining which one of the plurality of laser emitting elements is closest to reaching its end of an operating life;

means for restricting the irradiation of the determined laser emitting element closest to reaching its end of operating life; and high-resolution control means for reducing a rotational speed of the photosensitive member when the determining means determines one of the plurality of laser emitting element reaches its life and high-resolution printing mode is instructed for the image forming apparatus.

15. An image forming apparatus, comprising:

a photosensitive member;

an exposure device including a plurality of laser emitting elements, each laser emitting element irradiating a laser beam onto the photosensitive member to form an electrostatic latent image on the photosensitive member;

a developing device that supplies a developing agent to the electrostatic latent image to form a visible image; and a controller that controls the irradiation of the plurality of laser emitting elements, the controller comprising:

a determining device that determines which laser emitting element from the plurality of laser emitting elements is closest to reaching its end of operating life;

a restricting device that restricts the irradiation of the laser emitting element determined closest to reaching its end of operating life; and a high-resolution control device used to reduce a rotational speed of the photosensitive member when the determining device determines that one of the plurality of laser emitting elements reaches its end of operating life and high-resolution printing mode is instructed for the image forming apparatus.

16. The image forming apparatus according to claim 15, wherein the restricting device restricts the irradiation when the image forming apparatus is instructed to reduce consumption of the developing agent.

17. The image forming apparatus according to claim 16, wherein the restricting device restricts the irradiation when the image forming apparatus is placed in low-resolution printing mode.

18. The image forming apparatus according to claim 16, wherein the restricting device suspends the irradiation of the determined laser emitting element closest to reaching its end of operating life.

* * * * *

UNITED STATES PATENT AND TRADEMARK OFFICE
CERTIFICATE OF CORRECTION

PATENT NO. : 6,825,863 B2
DATED : November 30, 2004
INVENTOR(S) : Haruyuki Shimomura et al.

It is certified that error appears in the above-identified patent and that said Letters Patent is hereby corrected as shown below:

Title page,
Item [56], References Cited, U.S. PATENT DOCUMENTS, should read
-- 6,476,846 B1        11/2002        Kashima et al. --
FOREIGN PATENT DOCUMENTS, should read
-- JP    A-5-236213                         9/1993
   JP    A-7-276699                         10/1995
   JP    B2-2505226                         4/1996
   JP    A-8-123257                         5/1996
   JP    08-171061         A    *           7/1996
   JP    10-138560         A    *           5/1998
   JP    A-10-202942                        8/1998
   JP    A-10-213771                        8/1998
   JP    A-10-319789                        12/1998
   JP    2000-118040       A    *           4/2000
   JP    A-2001-293903                      10/2001
   JP    2002-149034       A    *           5/2002 --

Signed and Sealed this

Twenty-fourth Day of May, 2005

JON W. DUDAS
*Director of the United States Patent and Trademark Office*